United States Patent
Pai et al.

(10) Patent No.: US 12,242,543 B1
(45) Date of Patent: Mar. 4, 2025

(54) CONFIGURATION-BASED DEVELOPMENT OF ANALYTICS PIPELINES

(71) Applicant: Wells Fargo Bank, N.A., San Francisco, CA (US)

(72) Inventors: Gurudatta Pai, Matthews, NC (US); Menglin Cao, Danville, CA (US); Prahalad Thota, San Ramon, CA (US); Thomas Mann, Charlotte, NC (US); Braxton Meyer, Grafton, WI (US); Ravindra Reddy Pathakota, TegaCay, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1086 days.

(21) Appl. No.: 17/150,064

(22) Filed: Jan. 15, 2021

(51) Int. Cl.
*G06F 8/70* (2018.01)
*G06F 8/71* (2018.01)
(Continued)

(52) U.S. Cl.
CPC .............. *G06F 16/907* (2019.01); *G06F 8/71* (2013.01); *G06F 9/4843* (2013.01); *G06N 5/025* (2013.01);
(Continued)

(58) Field of Classification Search
CPC ..... G06T 15/005; G06F 9/4812; G06F 30/33; G06F 16/278; G06F 9/54; G06F 15/177; G06F 8/71; G06F 40/268; G06F 16/2457; G06F 16/907; G06F 9/4843; G06F 8/70; G06Q 30/0273; H04L 67/565
See application file for complete search history.

(56) References Cited

U.S. PATENT DOCUMENTS

| 10,372,721 | B2 | 8/2019 | Karpistsenko et al. |
| 10,620,923 | B2 | 4/2020 | Allan et al. |

(Continued)

FOREIGN PATENT DOCUMENTS

| CN | 103488631 A | 1/2014 |
| CN | 110069668 A | 7/2019 |

OTHER PUBLICATIONS

Lampa et al., "SciPipe: A workflow library for agile development of complex and dynamic bioinformatics pipelines", GigaScience, vol. 8, Issue 5, May 2019, 13 pp.
(Continued)

*Primary Examiner* — Tuan A Vu
(74) *Attorney, Agent, or Firm* — Shumaker & Sieffert, P.A.

(57) ABSTRACT

This disclosure describes techniques relating to development of data flow pipelines. In one example, this disclosure describes a method that includes accessing, by a computing system, metadata identifying characteristics of a data flow pipeline; generating, by the computing system and based on the metadata, the data flow pipeline, wherein the data flow pipeline includes a plurality of stages, and wherein the plurality of stages includes a multi-sourced stage in which data output by each of a subset of stages in the plurality of stages are used as input to the multi-sourced stage; executing, by the computing system, the data flow pipeline; detecting, by the computing system, modifications to the metadata; generating, based on the modifications, an updated data flow pipeline; and executing, by the computing system, the updated data flow pipeline.

12 Claims, 10 Drawing Sheets

(51) Int. Cl.
*G06F 9/48* (2006.01)
*G06F 16/907* (2019.01)
*G06N 5/025* (2023.01)
*G06F 16/2457* (2019.01)
*G06F 40/268* (2020.01)
*H04L 67/565* (2022.01)

(52) U.S. Cl.
CPC ........ *G06F 16/2457* (2019.01); *G06F 40/268* (2020.01); *H04L 67/565* (2022.05)

(56) References Cited

U.S. PATENT DOCUMENTS

| | | | |
|---|---|---|---|
| 10,698,625 | B2 | 6/2020 | Das et al. |
| 10,775,976 | B1* | 9/2020 | Abdul-Jawad ............ G06F 9/54 |
| 2003/0204819 | A1* | 10/2003 | Matsumoto ............. G06F 30/33 |
| | | | 716/102 |
| 2005/0102260 | A1* | 5/2005 | Spring ................. H04L 67/565 |
| 2006/0112328 | A1* | 5/2006 | Rojer .................... G06F 40/268 |
| | | | 715/234 |
| 2008/0136825 | A1* | 6/2008 | Bakalash .............. G06T 15/005 |
| | | | 345/501 |
| 2014/0282634 | A1* | 9/2014 | Phan .................. G06Q 30/0273 |
| | | | 725/32 |
| 2018/0052708 | A1* | 2/2018 | Ganesan ............... G06F 9/4812 |
| 2018/0075125 | A1* | 3/2018 | Stiel ...................... G06F 16/278 |
| 2019/0361697 | A1 | 11/2019 | Hu et al. |
| 2020/0242516 | A1 | 7/2020 | Dhingra et al. |
| 2021/0248165 | A1* | 8/2021 | Fry ....................... G06F 16/907 |
| 2021/0383258 | A1* | 12/2021 | O'Riordan ............ G06F 15/177 |
| 2022/0014584 | A1* | 1/2022 | Huetter ................. G06F 9/4843 |
| 2023/0081880 | A1* | 3/2023 | Mathur ............... G06F 16/2457 |
| | | | 707/732 |

OTHER PUBLICATIONS

Biornstad et al., "Let It Flow: Building Mashups with Data Processing Pipelines", ICSOC 2007 Workshops, vol. 4907, Sep. 2007, 14 pp.
Wood et al., "A Scalable Observation System for Introspection and In Situ Analytics", IEEE, 2016 5th Workshop on Extreme-Scale Programming Tools (ESPT), available online Jan. 26, 2017, 8 pp.

* cited by examiner

321

```
pipeline-L-driver.py import pyspark
from pyspark.sql import SparkSession import NLPLyft # dir containing NLPLyft must be in module import search path
from NLPLyft.framework import NLPLyftProject def main():
    sess = SparkSession.builder().appName("project_L").getOrCreate()

# create NLPLyftProject
    project_args = {
        'spark_session': sess,
        'dataset_config_paths': ('/foo/bar/project-L/config/pipeline-L_dataset-config.yml',),
        'pipeline_config_path': '/foo/bar/project-L/config/pipeline-L_pipeline-config.yml',
        'modules': {k: v for k, v in globals().items() if k in ('pyspark', 'NLPLyft')}
    }
    project = NLPLyftProject(**project_args)

# create Metadata object for input dataset
    input_parquet_metadata = project.dataset_config['parquet_input']

# create DAGPipeline and run stages A, B
    filtered_df = project.data_transform(input_parquet_metadata)[0]

# create PipelineModel and run stage C
    tokenized_df = project.preprocess(filtered_df)

# create PipelineModel and run stage D
    vectorized_df = project.predict(tokenized_df)

# Create DAGPipeline and run stages E
    saved_parquet_metadata = project.persist(vectorized_df)[0]
    print("Successfully saved pipeline output:\n{saved_parquet_metadata}")

if __name__ == "__main__":
    main()
```

FIG. 3B

441 ⤵ pipeline-B_dataset-config.yml

```yaml
model_registry:
    project_name: "pipeline-B"
    service_type: "predict"
    model_reg_path: "/foo/bar/baz/models/classifier.pkl"

datasets:
    excel_conversations:
        type: excel
        base_path: "/foo/bar/baz/conversations/excel" # required by Metadata base class
        ... # other entries as required by future ExcelMetadata class
        ... # optional entries for ExcelMetadata parquet_conversations:
        type: parquet
        base_path: "/foo/bar/baz/conversations/parquet"
        sub_paths:
            - "subpath1/record"
            - "subpath2/record"
            - "subpath3/record"
        partition_keys: # optional
            ...
        partitions: # optional
            ...
        column_subset: # optional
            ...
        num_partitions: # optional
            ...

parquet_cust_id_lookup_table:
        type: parquet
        base_path: "/foo/bar/baz/cust_data"
        sub_paths: []
```

FIG. 4B

442 pipeline-B_pipeline-config.yml

```
calendar: # optional
    run_partition_key: ...
    force_run_dates: ...
    skip_weekends: ...
    wf_holidays_to_skip: ...
    run_previous: ...
    run_histories: ...

data_transform:
    - name: read_excel_conversations # stage A in diagram
      class: NLPLyft.components.collect.ReadExcel # Note: this is hypothetical ~ not yet implemented
      args:
          ...

- name: remove_empty_worksheets # stage D in diagram
      class: NLPLyft.components.prepare.FilterDF
      args:
          ...

- name: drop_cell_comment_cols # stage E in diagram
      class: NLPLyft.components.prepare.DropCols # Note: this is hypothetical ~ not yet implemented
      args:
          ...

- name: read_parquet_conversations # stage B in diagram
      class: NLPLyft.components.collect.ReadParquet
      args:
          ...

- name: read_parquet_lookup_table # stage C in diagram
      class: NLPLyft.components.collect.ReadParquet
      args:
          ...

- name: join # stage F in diagram
      class: NLPLyft.components.collect.JoinDFs
      args:
          how: ...
          on: ...

- name: union_excel_parquet_conversations # stage G in diagram
      class: NLPLyft.components.collect.ReadExcel # Note: this is hypothetical ~ not yet implemented
      args:
          ...

- name: filter_on_category # stage H in diagram
      class: NLPLyft.components.prepare.FilterDF
      args:
          ...
preprocess:
    ML
    - name: tokenize # stage I in diagram
      class: pyspark.ml.feature.Tokenizer
      args:
          inputCol: ...
          outputCol: ...
predict:
    ML
        - name: make_w2v_features # stage J in diagram
          class: NLPLyft.components.vectorize.Word2Vec.Word2Vectorize
          args:
              ...

- name: apply_model_prediction # stage K in diagram
          class: NLPLyft.components.predict.py.ApplyPyTorchModel # Note: this is hypothetical ~ not yet implemented
          args:
              ...
              models:
                  model_binary_path: sklearn_classifier persist:
    - name: write_parquet # stage L in diagram
      class: NLPLyft.components.distribute.WriteParquet
      args:
          ...
```

```
pipeline-B-driver.py import pyspark
from pyspark.sql import SparkSession import NLPLyft
from NLPLyft.framework import NLPLyftProject def main():
    sess = SparkSession.builder().appName("project_B").getOrCreate()

# create NLPLyftProject
    project_args = {
        'spark_session': sess,
        'dataset_config_paths': ('/foo/bar/project-B/config/pipeline-B_dataset-config.yml',),
        'pipeline_config_path': '/foo/bar/project-B/config/pipeline-B_pipeline-config.yml',
        'modules': {k: v for k, v in globals().items() if k in ('pyspark', 'NLPLyft')}
    }
    project = NLPLyftProject(**project_args)

# create Metadata objects for input datasets
    excel_conversations_metadata = project.dataset_config['excel_conversations']
    parquet_conversations_metadata = project.dataset_config['parquet_conversations']
    parquet_lookup_table_metadata = project.dataset_config['parquet_cust_id_lookup_table']

# create DAGPipeline and run stages A, D, E, B, C, F, G, H
    unioned_and_filtered_df = project.data_transform(
        excel_conversations_metadata, parquet_conversations, parquet_lookup_table_metadata)[0]

# create PipelineModel and run stage I
    tokenized_df = project.preprocess(unioned_and_filtered_df)

# create PipelineModel and run stages J, K
    model_preds_df = project.predict(tokenized_df)

# Create DAGPipeline and run stage L
    saved_parquet_metadata = project.persist(model_preds_df)[0]
    print(f"Successfully saved pipeline output:\n{saved_parquet_metadata}")

if __name__ == "__main__":
    main()
```

FIG. 4D

CONFIGURATION-BASED DEVELOPMENT OF ANALYTICS PIPELINES

TECHNICAL FIELD

This disclosure relates to computing systems, and more specifically, to development of analytics pipelines.

BACKGROUND

In a typical machine learning model development process, the data engineering solution involves development of a data flow pipeline. In such a pipeline, data flows through a series of data transformation stages, resulting in output data. Such stages may involve processes pertaining to collection of data, preparation of data, processing data, making predictions, and distributing the output data. The pipeline might be viewed as a sum of those processes, with code managing the flow between each of the stages within the pipeline.

SUMMARY

This disclosure describes techniques relating to development of data flow pipelines. In one example, this disclosure describes a framework that enables configuration-based plug and play modification (and creation) of data flow pipelines. The framework exposes simplified interfaces for executing the pipeline. In some examples, techniques described herein may enable generation and execution of a pipeline based on metadata and reusable components in a way that hides complexity and reduces boiler code, while also making the data flow pipeline easy to share and understand. In some respects, techniques described herein may enable data engineers to focus more on project-specific data transformation and/or modeling activities that improve performance of the model, and less on tasks that involve writing code.

In some examples, this disclosure describes operations performed by a computing system or a set of compute nodes in a cluster of computing devices. In one specific example, this disclosure describes a method comprising accessing, by a computing system, metadata identifying characteristics of a data flow pipeline; generating, by the computing system and based on the metadata, the data flow pipeline, wherein the data flow pipeline includes a plurality of stages, and wherein the plurality of stages includes a multi-sourced stage in which data output by each of a subset of stages in the plurality of stages are used as input to the multi-sourced stage; executing, by the computing system, the data flow pipeline; detecting, by the computing system, modifications to the metadata; generating, based on the modifications, an updated data flow pipeline; and executing, by the computing system, the updated data flow pipeline.

In another example, this disclosure describes a system comprising a storage system; and processing circuitry having access to the storage device and configured to: access metadata identifying characteristics of a data flow pipeline; generate, based on the metadata, the data flow pipeline, wherein the data flow pipeline includes a plurality of stages, and wherein the plurality of stages includes a multi-sourced stage in which data output by each of a subset of stages in the plurality of stages are used as input to the multi-sourced stage; execute the data flow pipeline; detect modifications to the metadata; generate an updated data flow pipeline; and execute the updated data flow pipeline.

In another example, this disclosure describes a computer-readable storage medium comprising instructions that, when executed, configure processing circuitry of a computing system to access metadata identifying characteristics of a data flow pipeline; generate, based on the metadata, the data flow pipeline, wherein the data flow pipeline includes a plurality of stages, and wherein the plurality of stages includes a multi-sourced stage in which data output by each of a subset of stages in the plurality of stages are used as input to the multi-sourced stage; execute the data flow pipeline; detect modifications to the metadata; generate an updated data flow pipeline; and execute the updated data flow pipeline.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 3A and FIG. 3B illustrates an example pipeline that involves a simple linear series of stages, along with various configuration files, in accordance with one or more aspects of the present disclosure.

FIG. 4A, FIG. 4B, FIG. 4C, and FIG. 4D illustrate an example pipeline and corresponding configuration files for the illustrated pipeline, in accordance with one or more aspects of the present disclosure.

DETAILED DESCRIPTION

Figure 1:
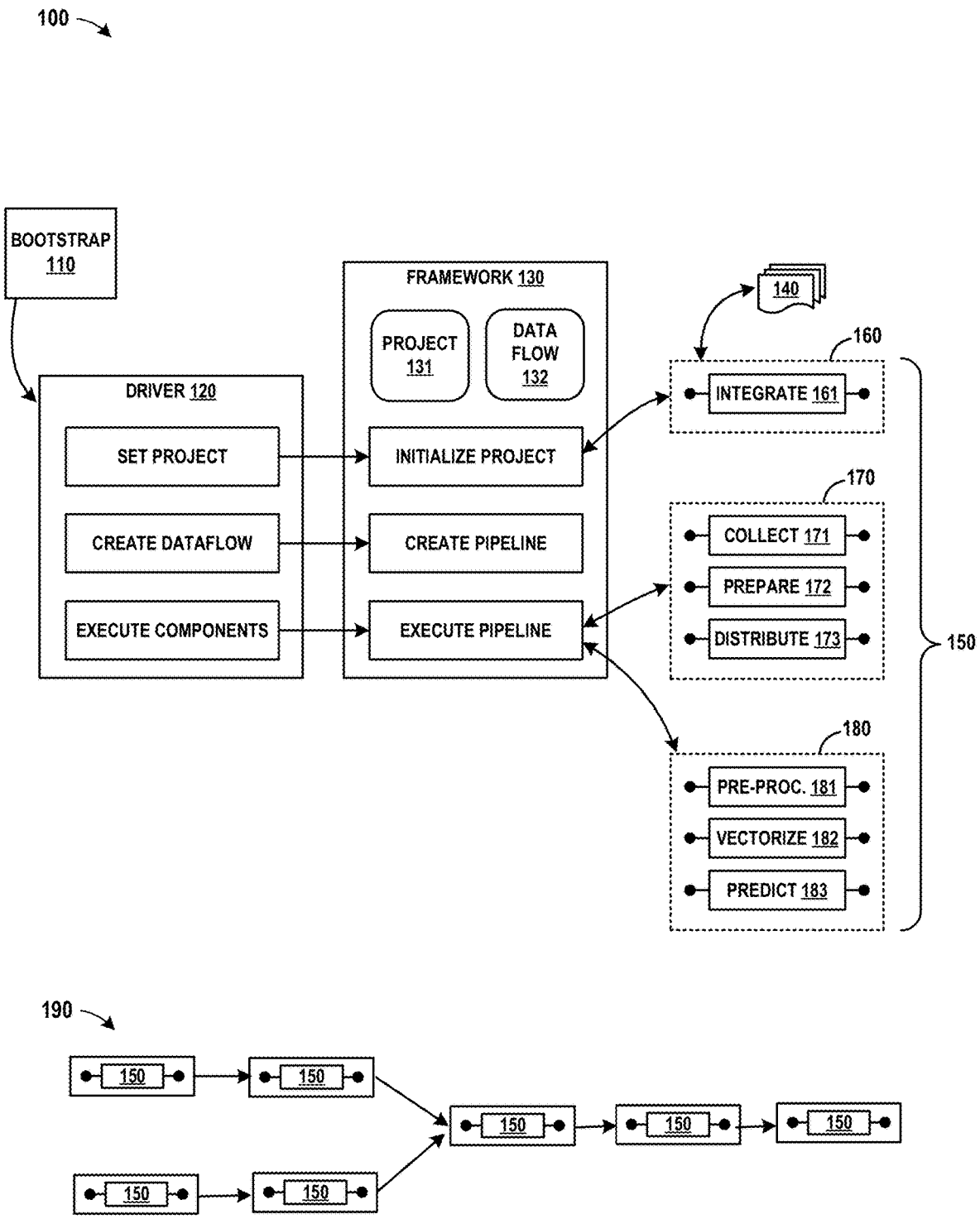
FIG. 1 is a conceptual diagram illustrating an example system for efficient development of an analytics data flow pipeline, in accordance with one or more aspects of the present disclosure.

In the machine learning context, the process for developing, deploying, and continuously improving a data engineering solution is often more challenging and complex as compared to traditional data engineering applications. This tends to be the case because different teams own different parts of process. Artificial intelligence technology teams address platform and operationalization. Data scientists focus on building and improving a model. Data engineers build pipelines to make data accessible. Often there is no clear hand-over between each set of teams or each part of the process, and no clear expectations on how to cross these boundaries. Such limitations can lead to delay, friction, and inefficiencies in the development of a data engineering solution.

Adding to the challenges is the notion that pipelines are not easy to test, version, and deploy to hybrid environments. Training environments might be very different from scoring environments, making pipelines hard to update. Developed pipelines can become stale quickly and may often need major refactoring to keep then running and relevant.

Still further, the data engineering artifacts are subject to change rapidly. For example, data transformation code, model architecture, and the input/output data structure are each subject to rapid changes, compounding the complexity of developing an effective data engineering solution.

In accordance with one or more aspects of the present disclosure, a model development framework is described herein that enables features and capabilities to drive operational excellence in model pipeline development process. Such a framework may simplify and accelerate pipeline development and enable flexible development of production-grade analytics data flow pipelines. One goal of such a framework is to streamline the data or model pipeline development process using configuration-based development, which enables data engineers to focus more on key tasks associated with the model pipeline development, rather than on other tasks that are often nevertheless necessary to develop a pipeline.

Accordingly, techniques are described herein that enable a standardized approach for pipeline development using configuration-based plug and play development and simplified interfaces for executing the pipeline. Some of the benefits that such a framework may provide include (1) a quick to market process that increases efficiency, (2) reusability that reduces operational redundancy, and (3) standardization that increases operational effectiveness.

To achieve a quick-to-market process, the disclosed framework enables a Plug-N-Play configuration-based model for pipeline development. The framework also provides an open architecture, enabling use of external libraries without writing significant amount of code, while also providing built-in features to leverage PySpark functions via configurations for text processing and data preparation.

To achieve reusability, the framework includes a number of building blocks in the form of prebuilt components ready for use in data engineering efforts, along with flexibility and scalability for creating more components. If the prebuilt components do not address a specific process needed by a proposed pipeline, an engineer may develop a custom component that can be readily applied within the framework. Such custom-developed components may be made available to others, enabling a community-driven environment encouraging others to add more reusable modules/components. The framework also includes reusable internal utilities and components (e.g., drivers and sample metadata files) for run-time execution.

To achieve standardization, the framework may enforce common standards and practices for pipeline development, and may provide a simplified way of developing driver code via method abstraction and a pre-generated standardized driver. A bootstrap utility may also be provided to compose and override reference data and/or configurations before submitting an application to the framework. Other utilities, including those to install and configure projects for quick startup, are described.

FIG. 1 is a conceptual diagram illustrating an example system for efficient development of an analytics data flow pipeline, in accordance with one or more aspects of the present disclosure. FIG. 1 includes bootstrap module 110, driver 120 and framework 130. In general, each of bootstrap module 110, driver 120, and framework 130 may be functional modules that execute on a computing system (not shown). In FIG. 1, project 131 may be a logical construct that includes a set of files and data used in developing a data engineering solution or a workspace. Files, data, and other objects included within project 131 are used in FIG. 1 to create logical data flow 132 and pipeline 190.

Logical data flow 132 may comprise a set of data structures, code, and other information that defines pipeline 190. Driver 120 and framework 130 may configure logical data flow 132 (and pipeline 190) based on one or more metadata files 140. Metadata files 140 may represent user-derived or other settings that define data sources, stages, components, operations, and settings associated with pipeline 190. Once logical data flow 132 is configured, driver 120 may interact with framework 130 to execute pipeline 190.

In FIG. 1, framework 130 is a model pipeline development framework inspired by a plug-n-play and loosely coupled component based architecture. Framework 130 enables data engineers to configure components 150 (e.g., which may involve engineers picking from among a pre-configured group of components 150 or newly created components 150) to meet specific business requirements for pipeline 190. Framework 130 thus enables design of one or more pipelines 190 based on business and/or performance needs. To minimize efforts required of engineers, framework 130 includes a number of pre-built components 150, which represent reusable building blocks/components for pipeline 190.

Framework 130 enables configuration-based integration of pipeline components or stages to simplify the work of developing pipelines 190. In general, configuration-based integration of components or stages means, in some contexts, that significant transformations or modifications to pipeline 190 may be made through simple, high-level changes to metadata files 140, where such changes do not require viewing or modifying any programming code. For example, configuring which components 150 are needed for a project pipeline may involve simply adding names of the components to one or more of metadata files 140. In some cases, high-level names of components are specified within a metadata file 140, along with any appropriate parameters for each component. Framework 130 may be configured to automatically generate, without requiring significant configuration by a user, a logical data flow 132 (and therefore pipeline 190) primarily using the information included within metadata files 140, thus requiring little or no programming input from the user. Once logical data flow 132 is configured, driver 120 may call interfaces within framework 130 to execute pipeline 190. Accordingly, system 100 is a configuration-based system that primarily relies on configurations within one or more of metadata files 140, rather than relying heavily on user- or engineer-developed source code.

As suggested above, operations performed by pipeline 190 may be carried out by one or more components 150. Components 150 may be categorized in different ways, and in FIG. 1, components 150 are categorized as framework components 160, data transformation components 170, and model inference components 180.

In terms of code, building blocks corresponding to data transformation components 170 and model inference components 180 are included within framework 130. Framework components 160 are framework-specific components or building blocks. In general terms, framework components 160 include convenience classes that simplify writing driver scripts for natural language processing and other types of pipelines, while data transformation components 170 and model inference components 180 correspond to organized groupings of configurable data transformations which can be selected and combined per project as necessary. The point of contact between framework components 160 packages on one hand, and data transformation components 170 and model inference components 180 packages on the other, is that framework components 160 include code for managing and creating pipelines, while data transformation components 170 and model inference components 180 are the stages in those pipelines.

Data transformation components 170 include one or more collect components 171, one or more prepare components 172, and on or more distribute components 173. Collect components 171 may be configured to read files, such as Parquet, Excel (XLS and CSV), and PDF files, and perform custom and/or specialized operations such as OCR, elastic search and/or reading data from custom data sources, and other operations. Accordingly, collect components 171 offer several features to collect data from structured and/or unstructured data sources. In Big-data fields, especially in Data Lake applications, unstructured data may be represented in structured format such as parquet file format, hive table format and/or in csv files, and it is possible that unstructured data may still exist in pdf and/or excel spreadsheets or scanned images in a data lake. Collect components 171 provide a unified interface to collect data from such sources, simplifying and standardizing the data extraction process.

Prepare components 172 may be configured to perform join, merge, filter, group, partition, and other operations for enriching one or more datasets. Accordingly, prepare components 172 are used when collected data needs to be further treated to generate the analytic ready data as an input for pipeline and/or as an output for data distribution. Many times, the data that is extracted from source may need to be processed by applying various transformations. In some cases, such data transformation activities are capable of operating on multiple dataset sources.

Distribute components 173 may be configured to persist or stream data to other applications or other destinations, store data to databases in various formats, and perform other operations. Accordingly, distribute components 173 provide features that can handle distributing the data to various channels. The channels may include persisting data into data lakes, streaming datasets to near-real-time streaming applications, and/or pushing data into external store such as relational databases and/or NoSQL data stores.

Model inference components 180 may include one or more preprocess components 181, vectorize components 182, and predict components 183. Preprocess components 181 may be configured to split sentences into tokens, paragraphs into multiple sentences, concatenate multiple sentences and/or words to form sentences and perform other custom operation using with an existing component such as spaCy, tokenizer components, and perform custom or other operations. Accordingly, preprocess components 181 may convert data into a clean data set as mandated by a given model architecture. Pre-processing refers to the transformations applied to data before feeding it is fed to AI/ML algorithms. While "prepare"-type components focus on preparing the input dataset by joining multiple datasets based on project requirements, pre-process components focus on structuring and cleaning the data as required by the model algorithms.

Vectorize components 182 may be configured to represent data as vectors by using Word2Vec, sklearn, and other libraries, and load vectors from files such as CSV, Parquet, or others. Natural language processing techniques are increasing relying on vectors to provide context to text, and the techniques used in generating vectors are evolving. Data scientists will generate and publish vectors in various formats-CSV format, Parquet format, sklearn format, word2Vec format, or in other formats. Vectorize components provide features for using these vectors without having to write a significant amount of code to condition their use in a pipeline.

Predict components 183 may be configured to perform operations relating to making machine learning predictions, including those that rely on PyTorch or Sklearn libraries, other libraries, or custom-developed libraries. Accordingly, predict components 183 offer a mechanism to conveniently use a model published by data scientists. Predict components 183 use pickle-based, PyTorch-based, and sklearn models for model inference.

In the example described in FIG. 1, framework components 160 include one or more integrate components 161 that enable framework 130 to stitch together other components 150 (i.e., data transformation components 170 and model inference components 180) to create pipeline 190. Integrate components 161 are also used by framework 130 for creating semantics of logical data flow 132. Integrate components 161 provide the basis of pluggable and loosely coupled architecture so that data engineers can add/remove components through changes in metadata (e.g., metadata files 140). Specifically, integrate components 161 may include components enabling interaction with registries maintained or used by framework 130, configuration of framework 130, and calendaring and/or scheduling functions for framework 130 (e.g., enabling periodic execution of pipeline 190). Integrate components 161 may thus be internal components, and in some implementations, are not explicitly used in pipeline 190.

Pipeline 190 may represent a series of operations corresponding to logical data flow 132. As shown, pipeline 190 may include a number of stages, each of which may involve execution of one or more components 150. Pipeline 190 may include a number of data flow branches, and can represent a complex pipeline of operations where data from. In some examples, each stage of pipeline 190 may be capable accepting data from more than one source, so that various stages within pipeline 190 may be multi-sourced.

In the example of FIG. 1, and in accordance with one or more aspects of the present disclosure, system 100 may initialize framework 130 to use project 131. For instance, with reference to FIG. 1, bootstrap module 110 begins executing on a computing system configured to execute driver 120 and framework 130. In some examples, bootstrap module 110 starts executing in response to user input or another event. Bootstrap module 110 starts execution of driver 120 and framework 130. Bootstrap module 110 provides information to driver 120 about which project (or solution or other work unit construct) to initialize. Based on the information provided to driver 120 by bootstrap module 110, driver 120 sets project 131 as the active project to be used within framework 130, and causes framework 130 to initialize project 131. To initialize project 131, framework 130 uses one or more of framework components 160 to read metadata files 140 associated with project 131. For example, framework 130 causes one or more integrate components 161 to read one or more of metadata files 140. Framework 130 uses information derived from metadata files 140 to initialize and instantiate project 131.

System 100 may create logical data flow 132 for project 131. For instance, referring again to FIG. 1, driver 120 of system 100 causes framework 130 to interpret metadata files 140. Framework 130 determines that metadata files 140 specify a series of operations within a defined data flow. Framework 130 further determines that metadata files 140 identify the order of the operations and any branching or use of multiple data sources by the data flow. Framework 130 creates logical data flow 132 corresponding to the configuration settings included in metadata files 140 for project 131.

System 100 may configure logical data flow 132 for execution. For instance, still referring to FIG. 1, framework 130 stitches together information about the identity and order of one or more components 150 corresponding to an ordered pipeline 190, and stores the information within 132. Framework 130 also stores information within logical data flow 132 that indicates how data is to flow from the start of pipeline 190 to the end of pipeline 190, and specifies data sources to be used in pipeline 190 and any branching or other operations performed by pipeline 190. In the example of FIG. 1, the ordered pipeline of operations thus comprises various components 150 that compose pipeline 190. Framework 130 stores logical data flow 132 in memory of a computing system (e.g., within the computing system executing framework 130). Once created and initialized, logical data flow 132 is configured and set up to perform automatic routing of data through each of the stages of pipeline 190, but framework 130 does not yet act on or initiate processing of pipeline 190.

System 100 may execute pipeline 190. For instance, still referring to FIG. 1, driver 120 outputs a command to framework 130 to execute pipeline 190. Framework 130 responds to the command by accessing logical data flow 132 for pipeline 190. Framework 130 invokes a number of calls to each of components 150 within pipeline 190 specified by logical data flow 132, thereby causing pipeline 190 to execute. Framework 130 may manage execution of pipeline 190 during processing, causing data to flow from the start to the end of pipeline 190, and verifying and/or ensuring that data from each stage of the pipeline is properly fed to other stages in pipeline 190. Accordingly, in some examples, framework 130 serves as an interface that calls or initiates execution of various components 150 specified by logical data flow 132 pursuant to execution of pipeline 190.

In the example described in connection with FIG. 1, configuring pipeline 190 may be performed without requiring any user of system 100 to write code. In some examples, bootstrap module 110 may be a standard script that can be used with little or no changes from project to project. Driver 120 may also be a standard set of instructions that require only relatively minor changes from project to project, specifying stages (e.g., groups of components 150) to be processed used in a given project. In many projects, groups of stages within a project may be relatively consistent and/or standardized (e.g., transform data, preprocess data, perform predictions, and persist results). For such projects, little or no changes to the code underlying driver 120 would be needed to the extent that driver 120 simply causes framework 130 to execute operations within each of the standardized groups of stages. Accordingly, much of the work to cause pipeline 190 to be constructed, instantiated, initialized, and processed may involve merely specifying information about pipeline 190 within metadata files 140. And in general, metadata files 140 simply specify data sources for pipeline 190 and which components 150 are included by pipeline 190, and in what order.

Therefore, in some examples, information within metadata files 140 will typically be sufficient to fully specify operations to be performed by pipeline 190. If metadata files 140 specifies data sources and the identity and order of components 150 included within 190, metadata files 140 are sufficient to define where each of components 150 are to receive its input and direct its output pursuant to pipeline 190. In some examples, metadata files 140 may be structured to be self-explanatory, meaning that each step of pipeline 190 is readily apparent through inspection of just metadata files 140, without understanding the source code underlying any of the operations performed by components 150 or pipeline 190. If structured to be self-explanatory, metadata files 140 (and by extension, pipeline 190) may be susceptible to review by non-programmers, enabling review or evaluation of metadata files 140 (and pipeline 190) by a group of evaluators or by a governance structure that includes non-programmers.

The framework described above in connection with FIG. 1 and elsewhere herein may represent a model development pipeline data engineering solution. Such a framework leverages technologies complementing speed to market and an agile development mindset, and is also flexible, lightweight, and not dependent upon code-writing resources. A number of key benefits are made possible through such a framework. Such benefits include: Strong discipline: bringing consistency in process, practices, and executions using continuous delivery principles. Improved productivity: automatic pipeline creation and reusable components hide complexity and reduce development of boiler code making data engineers more efficient by focusing on project-specific data transformation activities. Small adaption cycle: pluggable architecture and flexible metadata driven approach make it easier to add functionality to accommodate new use cases and requirements without having to write significant portion of code. Open & Scalable: allows for additional features, whether through internal development or community-driven efforts—just add new custom logic as "Component As a Stage" allowing seamless integration with internal and external data processing libraries. Workflow driven: add and remove new or custom data transformation stages in small and safe increments. Loosely coupled: data transformation stage components are monolithic and well-architected for separation. Platform thinking: developed for use on open platforms using Python-based Spark framework minimizes platform compatibility issues. No code deploy: generate a data pipeline that you can treat as production-grade artifact and put through deployment process with no refactoring. Generalized Driver: allows metadata to be composed and overridden just before the application runs making the application platform agnostic. Component Factory: provides number of reusable components & utilities for data transformation, setup, and operationalization. Demystify: metadata-driven approach makes it easy to share and understand pipeline. It dramatically reduces support/review time.

Figure 2:
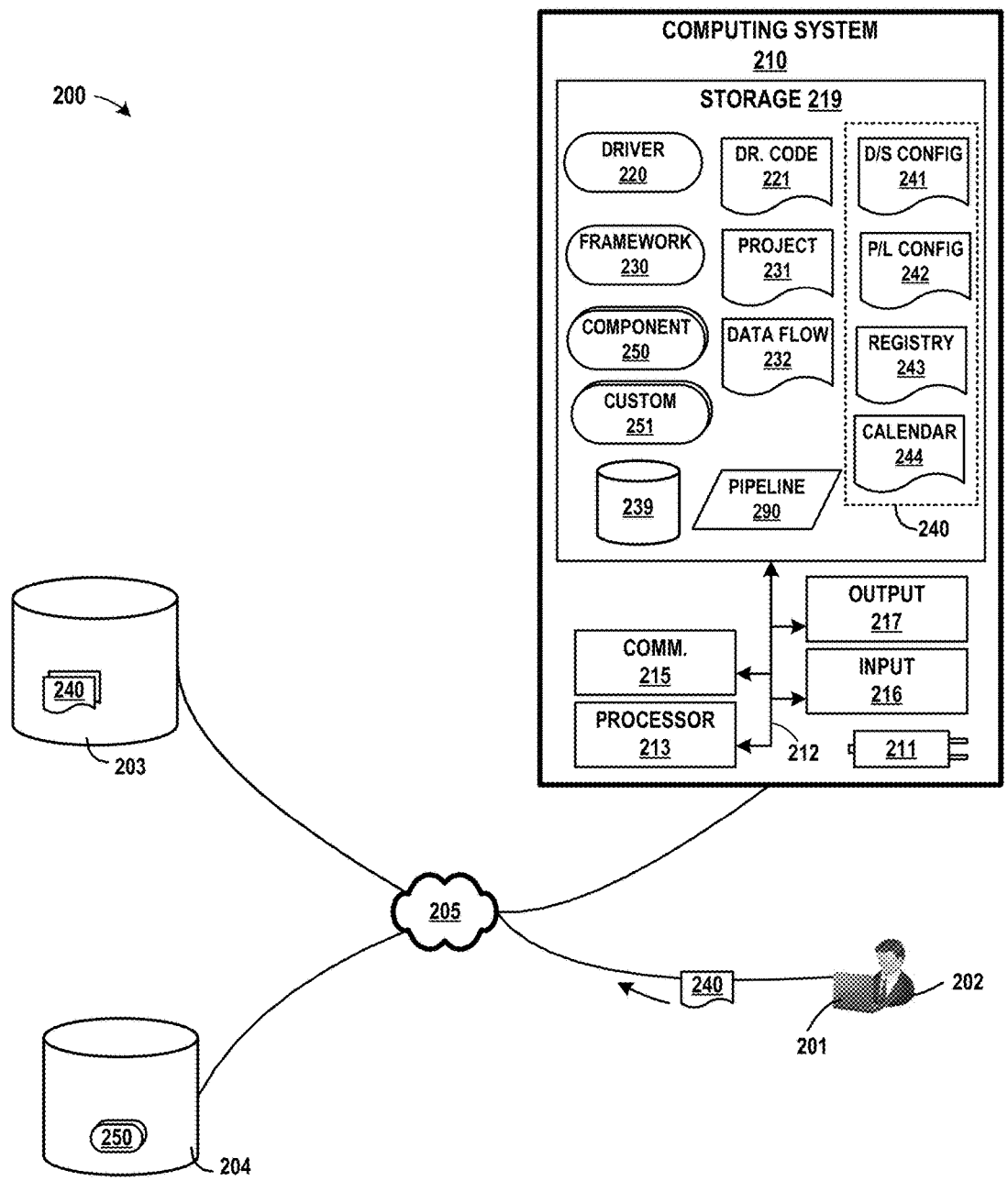
FIG. 2 is a block diagram illustrating an example system that enables efficient development of an analytics data flow pipeline, in accordance with one or more aspects of the present disclosure.

FIG. 2 is a block diagram illustrating an example system that enables efficient development of an analytics data flow pipeline, in accordance with one or more aspects of the present disclosure. System 200 of FIG. 2 may be described as an example or alternative implementation of system 100 of FIG. 1. In some examples, system 200 might be thought of holistic system for pipeline development, testing and executing data flow processes and/or components. One or more aspects of FIG. 2 may be described herein within the context of FIG. 1.

In the example of FIG. 2, system 200 includes computing system 210, computing device 201 (operated by user 202), configuration data store 203, and component data store 204. Each of these systems may be in communication over network 205. For ease of illustration, only one computing system 210, one computing device 201, one configuration data store 203, one component data store 204, and one network 205 is shown in FIG. 2, although techniques in accordance with one or more aspects of the present disclosure may be performed with many more of such systems. Network 205 may be implemented, in various examples, by any appropriate public or private network. In some examples, network 205 may correspond to the internet.

Computing system 210 represents a physical computing device or compute node that provides an execution environment for computing operations described herein. Although illustrated as a single computing system, computing system 210 may correspond to a cluster of computing devices, compute nodes, workstations, or other computing resources. In some examples, computing system 210 may represent one or more components of a cloud computing system, server farm, and/or server cluster (or portion thereof) that provide services to client devices and other devices or systems. Although primarily described herein as a physical computing device, computing system 210 may, in other examples, be implemented as one or more virtualized computing devices (e.g., as a collection of virtual machines or containers).

Computing device 201 may be implemented as any suitable computing system, such as a mobile, non-mobile, or other computing device. In some examples, computing device 201 may be integrated with computing system 210 or co-located with computing system 210, but is illustrated in the example of FIG. 2 as in communication with computing system 210 over network 205. Configuration data store 203 and component data store 204 may represent one or more computing devices, one or more storage nodes, and/or one or more virtualized computing systems that provide access to various data, components, computing modules or other information, as described herein. In some examples, configuration data store 203 may serve as a repository for one or more configuration files 240 used by computing system 210. Component data store 204 may serve as a repository for one or more components 250 used by computing system 210.

In the example of FIG. 2, computing system 210 includes underlying physical compute hardware that includes power source 211, one or more processors 213, one or more communication units 215, one or more input devices 216, one or more output devices 217, and one or more storage devices 219. One or more of the devices, modules, storage areas, or other components of computing system 210 may be interconnected to enable inter-component communications (physically, communicatively, and/or operatively). In some examples, such connectivity may be provided by through communication channels (e.g., communication channel 212), a system bus, a network connection, an inter-process communication data structure, or any other method for communicating data.

Power source 211 of computing system 210 may provide power to one or more components of computing system 210. One or more processors 213 of computing system 210 may implement functionality and/or execute instructions associated with computing system 210 or associated with one or more modules illustrated herein and/or described below. One or more processors 213 may be, may be part of, and/or may include processing circuitry that performs operations in accordance with one or more aspects of the present disclosure. One or more communication units 215 of computing system 210 may communicate with devices external to computing system 210 by transmitting and/or receiving data, and may operate, in some respects, as both an input device and an output device. In some or all cases, communication unit 215 may communicate with other devices over network 205.

One or more input devices 216 may represent any input devices of computing system 210 not otherwise separately described herein. One or more input devices 216 may generate, receive, and/or process input from any type of device capable of detecting input from a human or machine. For example, one or more input devices 216 may generate, receive, and/or process input in the form of electrical, physical, audio, image, and/or visual input (e.g., peripheral device, keyboard, microphone, camera).

One or more output devices 217 may represent any output devices of computing system 210 not otherwise separately described herein. One or more output devices 217 may generate, receive, and/or process output from any type of device capable of outputting information to a human or machine. For example, one or more output devices 217 may generate, receive, and/or process output in the form of electrical and/or physical output (e.g., peripheral device, actuator).

One or more storage devices 219 within computing system 210 may store information for processing during operation of computing system 210. Storage devices 219 may store program instructions and/or data associated with one or more of the modules described in accordance with one or more aspects of this disclosure. One or more processors 213 and one or more storage devices 219 may provide an operating environment or platform for such modules, which may be implemented as software, but may in some examples include any combination of hardware, firmware, and software. One or more processors 213 may execute instructions and one or more storage devices 219 may store instructions and/or data of one or more modules. The combination of processors 213 and storage devices 219 may retrieve, store, and/or execute the instructions and/or data of one or more applications, modules, or software. Processors 213 and/or storage devices 219 may also be operably coupled to one or more other software and/or hardware components, including, but not limited to, one or more of the components of computing system 210 and/or one or more devices or systems illustrated as being connected to computing system 210.

Driver module 220 may perform functions relating to interacting with framework module 230 to configure and/or execute one or more pipelines 290. Driver module 220 may execute driver code 221 and thus may operate based on code, settings, or configurations included within driver code 221.

Framework module 230 may provide functionality enabling configuration or management of projects 231, logical data flow 232 and/or pipeline 290. Framework module 230 may be configured to read configuration files 240, including dataset configuration file 241, pipeline configuration file 242, registry configuration file 243, and/or calendar configuration file 244 to create one or more logical data flows 232 in preparation for executing one or more pipelines 290. Framework module 230 may be configured to manage execution of pipeline 290.

Components 250 may serve as building blocks, used by framework module 230, for construction of pipeline 290. Custom-developed components 251 may similarly serve as building blocks for pipeline 290, but may represent custom or user-developed components 250.

Data store 239 may represent any suitable data structure or storage medium for storing information related to project 231, pipeline 290, or any of configuration files 240. The information stored in data store 239 may be searchable and/or categorized such that one or more modules within computing system 210 may provide an input requesting information from data store 221, and in response to the input, receive information stored within data store 221. Data store 221 may be primarily maintained by framework module 230.

For most projects involving use of framework module 230, initial development steps performed by engineers include preliminary data understanding, pipeline requirements gathering, and sample data validation. Once such steps are complete, engineers identify required components to compose a pipeline. As described in connection with FIG. 1, framework 130 (which may correspond to framework module 230 of computing system 210) includes a number of components 150 of various types (components 150 may correspond to components 250 included within storage device 219 of computing system 210).

System 200 may identify components required for a desired pipeline 290 through input received from a user (e.g., computing device 201). For instance, in an example that can be described in the context of FIG. 2, computing device 201 detects input (e.g., responsive to interactions from user 202) and outputs a signal over network 205. Communication unit 215 of computing system 210 detects a signal and outputs information about the signal to framework module 230. Framework module 230 determines that the input corresponds to information about one or more components 250 to be used in creating a pipeline of operations. Framework module 230 identifies, from among a library of components 250 within 219, which of components 250 are to be used in creating the specified pipeline.

In some examples, the library of components 250 included within storage device 219 (e.g., as part of framework module 230) might not have all the functionality required for the desired pipeline. In such an example, one or more components may be used from an alternative library of components (e.g., available on network 205 from component data store 204). In some examples, component data store 204 may correspond to a Python package or other library of components. To access a component available at component data store 204, framework module 230 causes communication unit 215 to output a signal over communication unit 215, specifying the identity of the desired component. Component data store 204 detects a signal over network 205 and determines that the signal corresponds to a request to use one or more components 250 stored on component data store 204. Component data store 204 outputs a responsive signal over network 205 that is detected by communication unit 215. Framework module 230 determines that the signal corresponds to information about one or more components 250 available at component data store 204. Framework module 230 further determines that the signal includes information sufficient to access and/or instantiate one or more components 250 from component data store 204. Framework module 230 stores components 250 (or information about components 250) within storage device 219 and/or within data store 239.

If no library is available with a suitable component, user 202 may create a custom component for use in the desired pipeline. In such an example, user 202 may develop, or commission the development of, one or more custom-developed components 251 having the appropriate functionality. Such a component may be developed in a project-specific package (e.g., a Python package) that can be imported into driver module 220. Alternatively, such a component may be developed based on a specification or application programming interface associated with framework module 230 (not shown in FIG. 2) that specifies requirements for how custom-developed components 251 are to be developed. Once developed, computing device 201 may communicate information each of custom-developed components 251 over network 205 and to computing system 210 for storage within storage device 219 of computing system 210.

Once components 250 are identified, engineers may develop one or more configuration files 240 that are used by framework module 230 to create logical data flow 232 (which may correspond to logical data flow 132 of FIG. 1). As in FIG. 1, logical data flow 232 of FIG. 2 may comprise a set of data structures, code, and other information that define pipeline 290. Driver module 220 and framework module 230 may configure logical data flow 232 (and pipeline 290) based on one or more configuration files 240. Configuration files 240 (which may correspond to metadata files 140 of FIG. 1) may represent user-derived or other settings that define data sources, stages, components, and operations associated with pipeline 290. Once logical data flow 232 is created, computing system 210 may execute driver module 220 (based on driver code 221), causing driver module 220 to call interfaces exposed by framework module 230, and thereby execute pipeline 290.

Accordingly, in the example of FIG. 2, system 200 may create or update driver code 221. For instance, referring again to FIG. 2, computing device 201 detects input and outputs a signal over 205. Communication unit 215 of computing system 210 detects a signal that processor 213 determines corresponds to input based on interactions by user 202 at computing device 201. Processor 213 further determines that the input includes driver code 221. Processor 213 stores driver code 221 within storage device 219. In the example being described, driver code 221 is a script that, when executed by driver module 220, creates an object (e.g., project 231) within framework module 230 and uses its methods to create and execute logical data flow 232 corresponding to pipeline 290.

System 200 may create one or more configuration files 240. For instance, still referring to the example being described in the context of FIG. 2, communication unit 215 detects input (e.g., from computing device 201 in response to interactions from user 202) that processor 213 determines corresponds to information sufficient to create or update one or more configuration files 240. In some examples, configuration files 240 may include dataset configuration file 241, pipeline configuration file 242, registry configuration file 243, and/or calendar configuration file 244. Processor 213 causes information about such configuration files 240 to be stored within storage device 219 of computing system 210. One or more of such configuration files 240 may include information specifying about stages for pipeline 290, datasets to be processed by pipeline 290, and model data locations to be used in pipeline 290.

In some examples, information included within one or more of configuration files 240, such as pipeline configuration file 242, may make driver code 221 (or modifications to a standard set of driver code 221) unnecessary. For instance, driver code 221 may be standardized or preconfigured in such a way that it causes execution of a specified set of stages (e.g., "data transform," "preprocess," "predict," and "persist"), each corresponding to a set of components to be executed within a pipeline. In such an example, pipeline configuration files 242 may be written to specify the components in each of the standardized stages called by driver code 221. Therefore, creating or modifying driver code 221 based on input from a user, as described above, might not be necessary if driver module 220 and/or driver code 221 are already pre-configured to process the standardized set of stages. Any pipeline that has stages corresponding to the standardized set of stages may work with such a preconfigured driver code 221. Arranging driver code 221 and pipeline configuration file 242 in such a manner may therefore further reduce the configuration and/or code-writing burden on a user that seeks to create, configure, and execute pipelines using system 200.

Once driver code 221 and configuration files 240 have been configured and/or written, system 200 may perform integration tests. For instance, referring again to the example being described in the context of FIG. 2, input device 216 may detect input that framework module 230 determines corresponds to a request to test the functionality of framework module 230. Framework module 230 may further determine that the input includes information about integration tests or information about which integration tests are available or should be performed. Framework module 230 performs integration tests by verifying outputs of a pipeline (e.g., a model pipeline used for testing or, in some examples, pipeline 290) when validated sample data is used as the input(s) to such a pipeline.

System 200 may finalize project 231 and package project 231 for use within computing system 210 or elsewhere. For instance, still referring to FIG. 2, framework module 230 collects driver module 220, configuration files 240, any project-specific components 250 (and custom-developed components 251), and information about the version of framework module 230. In some examples, information about the version of framework module 230 may include the version number of framework module 230 used for pipeline development and integration testing. Framework module 230 packages the collected information into project 231 for use in later instantiating an executing pipeline 290. Framework module 230 stores project 231 within storage device 219 and/or within data store 239. In some examples, framework module 230 may distribute project 231 to other computing systems (e.g., over network 205) for execution on such computing systems.

To execute pipeline 290 during production, computing system 210 (or another computing system) may create logical data flow 232. For instance, still referring to FIG. 2 and assuming pipeline 290 is to execute on computing system 210, communication unit 215 of computing system 210 detects input that 213 determines corresponds to a request to execute a pipeline specified within project 231. Responsive to the request, processor 213 kicks off driver module 220. Driver module 220 loads driver code 221 and executes driver code 221. Based on driver code 221, driver module 220 proceeds (1) set project 231 as an active project to be executed at computing system 210, (2) create logical data flow 232 in preparation for executing pipeline 290, and (3) execute pipeline 290.

To set project 231 as the active project, driver module 220 reads information about project 231 and starts framework module 230 (which may be a runtime version of framework module 230, packaged within project 231). Driver module 220 initializes framework module 230 to use project 231 as an active project being executed at computing system 210. Driver module 220 also configures project 231 with one or more framework components that enable reading of configuration files 240.

To create logical data flow 232 in preparation for executing pipeline 290, driver module 220 causes framework module 230 to interpret configuration files 240. Framework module 230 reads configuration files 240 and determines that configuration files 240 include information enabling instantiation and execution of pipeline 290. Framework module 230 reads dataset configuration file 241 to identify data sources. Configuration file 240 reads pipeline configuration file 242 to identify components to be used in a pipeline and the order of those components. Framework module 230 reads registry configuration file 243 to determine information about any arguments that should be used for configuring one or more of components 250 specified within pipeline configuration file 242. Framework module 230 reads calendar configuration file 244 to identify any information about how often and at what times pipeline 290 is to be executed. Framework module 230 creates logical data flow 232 based on configuration files 240, stitching together information about the identity and order of one or more components 250, and creating an ordered pipeline of operations corresponding to the specified components 250 for pipeline 290. Framework module 230 stores information within logical data flow 232 that indicates how data is to flow from the start of pipeline 290 to the end of pipeline 290, and specifies data sources to be used in pipeline 290 and any branching or other operations performed by pipeline 290. Once created, logical data flow 232 is configured and set up to perform automatic routing of data through each of the stages of pipeline 290.

To execute pipeline 290, driver module 220 uses framework module 230 as an interface to call various components 250 within pipeline 290. For instance, still referring to FIG. 2, framework module 230 invokes a number of calls to each of components 250 specified by logical data flow 232 and corresponding to pipeline 290, thereby causing pipeline 290 to execute, and causing data to flow from the start to the end of pipeline 290. Framework module 230 manages execution of pipeline 290 during processing, verifying and/or ensuring that data from each stage of the pipeline is properly fed to other stages in pipeline 290. Data produced by pipeline 290 may be stored within storage device 219 or may be distributed over network 205.

In accordance with one or more aspects of the present disclosure, pipeline 290 may be modified in response to changes to one or more of configuration files 240. In some examples, modifications to pipeline configuration file 242 can be made that plug-in (add), reorder, and/or plug-out (remove) one or more components 250 within pipeline 290. For instance, still referring to FIG. 2, input device 216 may detect input that framework module 230 determines corresponds to modifications to pipeline configuration file 242. Framework module 230 determines that references to one or more components 250 have been removed from pipeline configuration file 242, and framework module 230 interprets such removal as corresponding to a plug-out configuration change (removing stages from pipeline 290). Alternatively, or in addition, framework module 230 determines that references to one or more other components 250 have been added to pipeline configuration file 242, and framework module 230 interprets such additions as a plug-in configuration change (e.g., adding stages to pipeline 290). Alternatively, or in addition, framework module 230 determines that other changes have been made to pipeline configuration file 242, and framework module 230 interprets such additions as modifications to the order of components 250 included within pipeline 290. Responsive to such changes, framework module 230 modifies project 231. Also responsive to such changes, framework module 230 modifies logical data flow 232.

Computing system 210 may execute a modified version of pipeline 290, corresponding to modified logical data flow 232. In the example just described, changes to pipeline 290 can be made merely by making changes to one or more of configuration files 240 (e.g., pipeline configuration file 242 and/or dataset configuration file 241). Since components 250 included within (executed by) pipeline 290 are configured based on pipeline configuration file 242, pipeline configuration file 242 serves as a mechanism by which plug-in/plug-out configuration capability is enforced. Pipeline configuration file 242 may also serve as the mechanism for enforcing changes to the order of stages within pipeline 290 or changes to the branching of stages within pipeline 290. By simply making changes to one or more of configuration files 240 (e.g., pipeline configuration file 242), as described herein, pipeline 290 can be significantly restructured. In some or all examples, the described changes to pipeline configuration file 242 (resulting in corresponding changes to pipeline 290) can be made without requiring knowledge of the underlying code embodied in pipeline 290 or any of components 250 that are executed by pipeline 290.

Modules illustrated in FIG. 2 (e.g., driver module 220, framework module 230, components 250, and custom-developed components 251) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
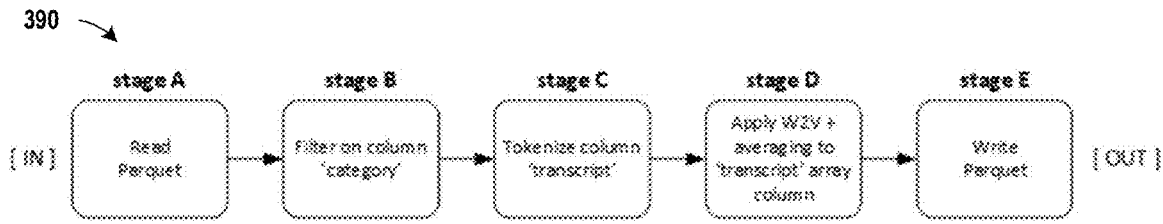

FIG. 3A and FIG. 3B illustrate an example pipeline that involves a simple linear series of stages, along with various configuration files, in accordance with one or more aspects of the present disclosure. FIG. 3A illustrates pipeline 390, dataset configuration file 341, and pipeline configuration file 342. FIG. 3B illustrates example driver code 321 that can be used to execute pipeline 390 of FIG. 3A. Pipeline 390 may be an example of pipeline 190 of FIG. 1 or pipeline 290 of FIG. 2. Similarly, each of dataset configuration file 341, pipeline configuration file 342, and driver code 321 may be examples of dataset configuration file 241, pipeline configuration file 242, and driver code 221 of FIG. 2, respectively. Configuration files shown in FIG. 3A and FIG. 3B are drawn from an actual implementation (entitled "NLPLyft") of concepts described herein, and thus, such files may include references to specific objects, classes, and attributes of the NLPLyft implementation.

In the example of FIG. 3A, pipeline 390 may be considered a directed acyclic graph, where nodes within pipeline 390 represent pipeline stages and the edges (connections) represent movement of data. In the example shown, pipeline 390 ("Pipeline L," representing a "linear" pipeline) illustrates a seven stage ("A" through "E") data flow that does not include any branching or any multiple data sources for any stage. Stage A of pipeline 390 reads Parquet data and stage E of pipeline 390 persists Parquet data. Both stages A and E may be implemented by one or more components drawn from a group of data transformation components (see, e.g., data transformation components 170 of FIG. 1). Stages B and C perform preprocessing steps, and stage D of pipeline 390 may generate a prediction. Each of stages B, C, and D may comprise components drawn from a group of model inference components (see model inference components 180 of FIG. 1).

In the context of FIG. 2, dataset configuration file 341 may be read by a component or module within framework module 230 of computing system 210. In such an example, a component or module (e.g., a "DatasetConfig" class) may be responsible for reading from and parsing dataset configuration files 341, and may create objects (e.g., "Metadata" objects) to represent each individual dataset needed for the project corresponding ton pipeline 390.

Similarly, pipeline configuration file 342 may also be read by the same component or a different component or module within framework module 230. Such a component (e.g., a "PipelineConfig" class) may be responsible for reading stage information from pipeline configuration file 342 and managing access to each stage's configuration.

For example, some implementations of framework module 230 may use two different types of pipelines: a "directed acyclic graph (DAG) pipeline," and a "machine learning (ML) pipeline." A "DAG pipeline" implements a pipeline based on a graph (e.g., a DAG graph), can read data from multiple sources, and can preprocess more than one data frame. A DAG pipeline can exist standalone, and typically has no dependencies. DAG pipelines are typically used when there is a need to read data from multiple sources, and handle multiple data frames.

An "ML pipeline" is used to implement a PySpark ML pipeline. In some implementations, an ML pipeline might not be able to read data from a dataset, and might not be able to preprocess more than one data frame. Yet an ML pipeline may be able to exist standalone, and also typically does not have any dependencies. ML pipelines are typically used whenever there is a need to apply PySpark ML features on a single data frame.

In pipeline configuration file 342, stages are divided into named groups, with names "data_transform," "predict," and "persist." Each of these named groups may have its own significance.

The "data_transform" group is a collection of DataCollect & Prepare components (corresponding to collect components 171 and prepare components 172 of FIG. 1) that are used for transforming the input data set into a format ready to use with data processing techniques, such as natural language processing (NLP) techniques. Each component within this group may be a stage in the data_transform pipeline that receives an input from one or more previous stages, applies data transformation techniques, and passes on the output to a later stage. One or more DataCollect components (see, e.g., collect component 171 of FIG. 1) are typically used in the "data_transform" stage, and are used to collect data from various data sources represented in structured and/or unstructured format. One or more Prepare components (see, e.g., prepare component 172 of FIG. 1) are used to work with data collected from one or multiple data sources where further transformation is needed on the collected data. Often, data that is extracted from a source may need to be prepared by applying various transformations such as join, union, filter, or other operations. The data_transform stage generally implements only DAG pipelines and may be mandatory in some implementations, since most pipelines require some reading of files or data, joining of files or data, and/or filtering of resulting data. As used in dataset configuration file 341 or similar configuration files, the "data_transform" group/section may have the form:

```
data transform:
    name: stage1
    class: Reading a Parquet file
    args:
    name: stage2
    class: De-duplicate data
    args:
    name: stage3
    class: Reading a Parquet file
    args:
    name: stage4
    class: De-duplicate data
    args:
    name: stage5
    class: Join both datasets
    args:
    name: stage6
    class: Filter Data
    args
```

The "preprocess" group/section is a collection of ModelDataPreprocessing components (corresponding to preprocess components 181 of FIG. 1) that are used to convert the raw data into a clean data set. Whenever the data is gathered from different sources it is collected in raw format which is often not practical for use in an analysis. Pre-processing refers to the transformations applied to our data before feeding it to the algorithm. Preprocess components may provide many features to transform the data, including tokenization, stemming, stop word removal, and others. The "preprocess" section within pipeline configuration file 342 may be optional for any given project and it is further divided into DAT and ML subgroups. Preprocess implements both DAG & ML pipelines. All the stages to be part of DAG pipeline would be under the subgroup DAG. Similarly, stages to be part of ML pipeline would be under the subgroup ML. Subgroups will not be repeated more than once and if both DAG & ML subgroup stages are present, DAG always precedes ML subgroup. As used in dataset configuration file 341 or similar configuration files, the "preprocess" group/section may have the form:

```
preprocess:
    DAG:
        name: stage1
        class:
        args:
        name: stage2
        class:
        args:
    ML:
        name: stage1
        class: Tokenization
        args:
        name: stage2
        class: Stemming
        args:
```

The "predict" group/section is a collection of Vectorizer, Training, & Scoring components (corresponding to vectorize components 182 and 183 of FIG. 1). In some examples, no preprocessing stages are included within the predict group as it may be helpful in some cases to use the predict group strictly for Vectorization and Scoring. In some examples, the predict group/section may be optional. The section may also be divided into the following two subgroups: DAG, ML. Predict implements both DAG & ML pipelines. All the stages to be part of DAG pipeline would be under the subgroup DAG. Similarly, stages to be part of ML pipeline would be under the subgroup ML. Subgroups will not be repeated more than once and if both DAG & ML subgroup stages are present, DAG always precedes ML subgroup. As used in dataset configuration file 341 or similar configuration files, the "predict" group/section may have the form:

```
predict:
    DAG:
        name: stage1
        class:
        args:
        name: stage2
        class:
        args:
    ML:
        name: stage1
        class:
        args:
        name: stage2
        class:
        args:
```

The "persist" group/section is a collection of Persist components (corresponding to distribute components 173 of FIG. 1). This section contains persist stages of a project, enabling persisting of a data frame to parquet files, csv files, text files, and others. The persist section generally will always implement a DAG pipeline. As used in dataset configuration file 341 or similar configuration files, the "persist" group/section may have the form:

```
persist:
    name: stage1
    class:
    args:
```

Also, as described above, each stage entry contains "class" and "args" entries, which may be required to ensure that parameters and other settings are provided. A third entry, "models," may optionally allow user to specify keyword arguments that framework module 230 may look up in a model registry. In some examples, the PipelineConfig object is responsible only for managing configuration related to stages, not actually creating stages, so the lookup of such registry attributes (e.g., specified in registry configuration file 243 of FIG. 2) might not be performed by the PipelineConfig object. The order of stages within dataset configuration file 341 is often important, and may be subject to specific rules (further described below in connection with FIG. 5) that users of computing system 210 (or framework module 230 specifically) may need to understand when implementing one or more pipelines 390.

In some examples, the PipelineConfig class (or alternatively, a different component or class) within framework module 230 may create a calendar object (e.g., "Calendar" object) based on calendar-related configuration information within pipeline configuration file 342 (see calendar configuration information 352 within pipeline configuration file 342 of FIG. 3A). The calendar object may manage periodic execution of pipeline 390 (e.g., hourly, daily, weekly, etc.). In some examples, project 231 may have a _dataset_config attribute of type "DatasetConfig," and a _pipeline_config attribute of type "PipelineConfig." In the examples shown, separate YAML files are used for dataset configuration file 341 and pipeline configuration file 342, but in other implementations, it might be possible to use the same YAML file for the information in both dataset configuration file 341 and pipeline configuration file 342. The illustrations of dataset configuration file 341 and pipeline configuration file 342, shown in FIG. 3A, indicate an example of how such configuration files would appear for a pipeline such as pipeline 390.

In FIG. 3B, a sample driver code 321 is illustrated, suitable for use with pipeline 390, dataset configuration file 341 and pipeline configuration file 342 of FIG. 3A. The example illustrated assumes that the file paths for dataset configuration file 341 and pipeline configuration file 342 are "/foo/bar/project-L/config/pipeline-L_dataset-config.yml" and "/foo/bar/project-L/config/pipeline-L_pipeline-config.yml", respectively. Note that calls corresponding to each of the groups specified in pipeline configuration file 342 ("data_transform," "preprocess," "predict," and "persist") are included within driver code 321. Driver code 321 may be able to be used, without modification, with any pipeline configuration file that specifies these same groups.

Figure 4A:
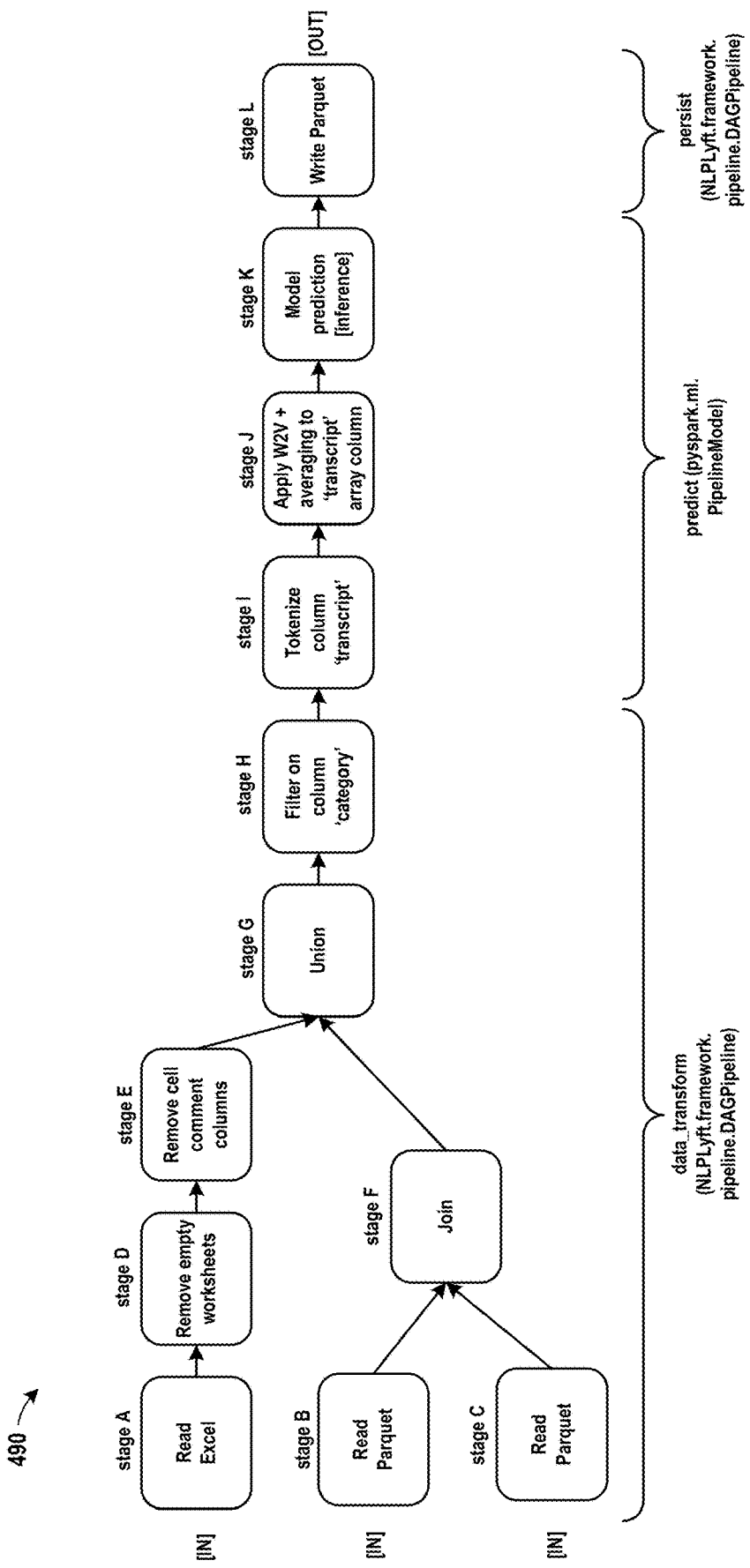

FIG. 4A, FIG. 4B, FIG. 4C, and FIG. 4D illustrate an example pipeline and corresponding configuration files for the illustrated pipeline, in accordance with one or more aspects of the present disclosure. FIG. 4A illustrates pipeline 490, which involves a relatively complex series of stages, involving branching and multiple data sources used as input to some pipeline stages. In pipeline 490 ("Pipeline B," representing a "branching" pipeline), two kinds of data are read using separate Collect stages, and one requires several processing steps before the datasets are combined and further processed. Specifically, pipeline 490 illustrates stages "A" through "L," where both Excel and Parquet data are read, processed, joined and unioned before being further processed. Stages I through K are implemented using an ML pipeline leveraging the PySpark Python API. FIG. 4B illustrates an example dataset configuration file 441 corresponding to pipeline 490 of FIG. 4A. FIG. 4C illustrates an example pipeline configuration file 442 corresponding to pipeline 490 of FIG. 4A. FIG. 4D illustrates example driver code 421 that can be used to execute pipeline 490 of FIG. 4A. The example illustrated assumes that the file paths for dataset configuration file 441 and pipeline configuration file 442 are /foo/bar/project-B/config/pipeline-B_dataset-config.yml and /foo/bar/project-B/config/pipeline-B_pipeline-config.yml, respectively.

Figure 5:
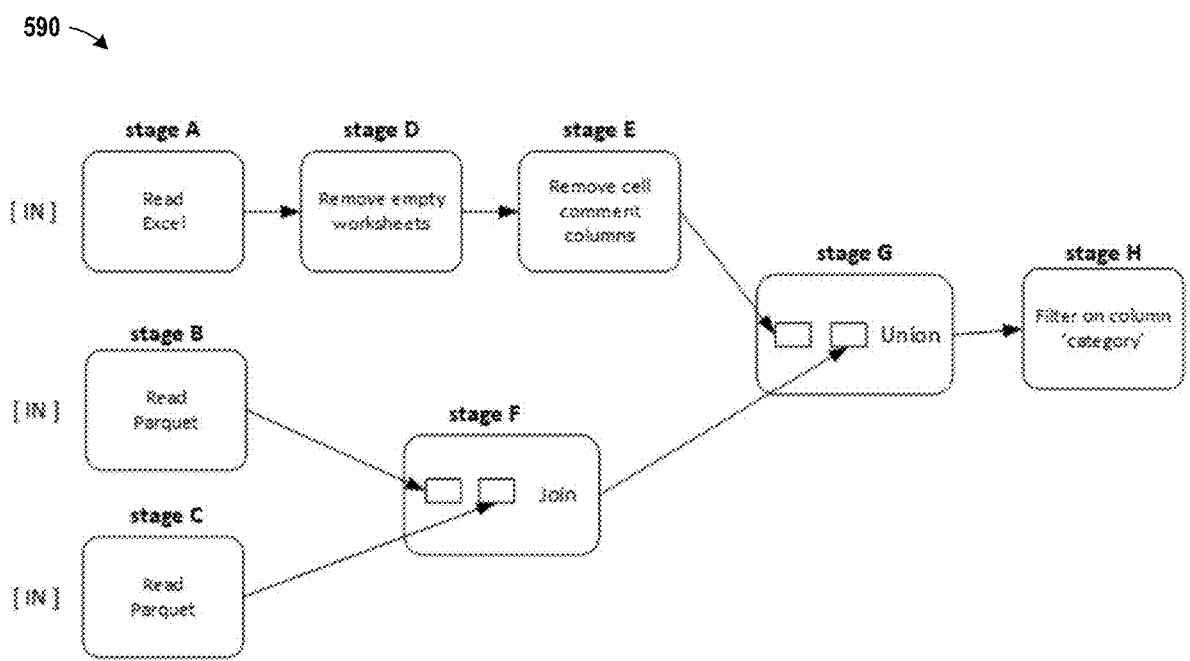
FIG. 5 illustrates an example pipeline having branches that can be specified by an example pipeline configuration file, in accordance with one or more aspects of the present disclosure.

FIG. 5 illustrates an example pipeline having branches that can be specified by an example pipeline configuration file, in accordance with one or more aspects of the present disclosure. Specifically, FIG. 5 illustrates pipeline 590, which is a portion of pipeline 490 of FIG. 4A, and includes just the stages listed under the "data_transform" section of pipeline configuration file 442 of FIG. 4C. As described herein, stages of pipeline 590 (or pipeline 490 of FIG. 4A) can be specified within pipeline configuration file 442 in such a way to ensure that the order of execution of each of stages "A" through "H" in FIG. 5 is as shown in FIG. 5.

In general, to accommodate pipelines that include branching structures, some conventions may be helpful for ensuring that a known, deterministic process is used to transform settings included in an ostensibly linear file, such as pipeline configuration file 442 of FIG. 4B, into an appropriately non-linear pipeline. One of the assumptions and/or generalizations that may be made to ease the writing of driver scripts (e.g., driver code 321, driver code 421) is that most project pipelines will consist of three smaller pipelines (or subsections of a larger overall project pipeline). These smaller pipelines may be designated "data_transform," "predict," and "persist" as in FIG. 3A and FIG. 4C. The use of such pipelines may be made easier by the way PipelineConfig instances expose pipeline config information and the inclusion of data_transform, predict, and persist convenience methods in a project class within framework module 230 (see FIG. 2). Under the hood, framework module 230 of FIG. 2 may assume that in most cases, the "predict" pipeline (e.g., stages "I," "J," and "K" of pipeline 490) will be a linear series of stages that can be implemented as a pyspark.ml.PipelineModel, while "data_transform" and "persist" pipelines will often have branches. In order to implement the "data_transform," "persist," and any other branching pipeline a user wishes to define, a "Pipeline" class may accommodate such branching. While linear pipelines tend to always have a single correct stage order, the correct ordering of stages is crucial in the configuration and execution of any pipeline (segment). In an implementation of framework module 230 that uses "DAG" and "ML" pipelines, as described herein, such branching pipelines will typically be instantiated as DAG pipelines.

For the most part, every pipeline, whether there are branches or not, can be represented as a DAG, with stages as nodes and data movement as edges/vertices. The diagrams of pipelines L and B (FIG. 3A and FIG. 4A, respectively) are DAG diagrams, where each stage is connected to downstream stages by one-way arrows. "Linearization" can be defined to mean a linear sequence of stages which can be converted into a DAG via some deterministic (no randomness involved) process. In order to linearize a DAG, not only a linear sequence of stage names is generally required, but also the number of inputs and outputs for each stage. A simple example of a linearization is provided by pipeline-L_pipeline-config.yml of FIG. 3A, where the order of stages given for pipeline L (ignoring the top-level "data_transform," "predict," and "persist" groupings) is A, B, C, D, E. In such an example, each stage receives exactly one input and returns exactly one output. The linearization converts to the linear DAG shown as pipeline 390 of FIG. 3A.

But pipeline 490 as illustrated in FIG. 4A includes branches. Because of the branches, and because some of the branches contain multiple stages, there is no obvious, unambiguous linearization. For any linearization that might be chosen, converting it into the correct DAG depends on the conversion algorithm making certain assumptions or interpretations of the linear ordering. Accordingly, applying a set of rules that will result in a consistent linearization is helpful to enforce consistency in how files such as dataset configuration file 341 and/or dataset configuration file 441 are to be written.

In one example described herein, a set of four rules can be used to guarantee that a linearization process will result in a conversion to the correct DAG by the internals of framework module 230 or any Pipeline object implemented by framework module 230. In such an example, the rules for ordering stages in a file such as pipeline configuration file 442 may be stated as follows:

1. Every stage with a single input must be immediately preceded by the stage that produces that input.
2. For every stage M that receives more than one input, all stages $i_1$ to $i_n$ that directly produce those inputs must occur somewhere before M in the linearization.
3. For every stage M that receives more than one input, the stages that directly produce M's inputs must occur in the same relative order that M expects to receive them in.
4. For every stage M that receives more than one input, for all i in [1, n−1], where $i_1$ to $i_n$ are the stages that produce M's inputs. $I_i$ and all of its ancestor stages must occur before $I_{i+1}$ and any of $I_{i+1}$'s ancestor stages (i.e., all stages of one branch must occur before any stage of the next branch)

With reference to the pipeline 590 of FIG. 5, and to demonstrate the operation of the foregoing rules, application of each rule may be considered separately, considering just the stages listed under the "data_transform" section within pipeline configuration file 442.

Rule 1 is only applicable to stages with a single input (i.e., A, B, C, D, E, H). For each of these stages, the stage that produces its input data, if any, must immediately precede it in the linearization. This means that: A must immediately precede D, D must immediately precede E, and G must immediately precede H. Although rule 1 applies to A, B, and C, the input data to these stages is not produced by other stages, but is passed directly to a transform method of the Pipeline or DAGPipeline object. So rule 1 doesn't force us to make any decisions about which stages immediately precede A, B, or C.

Rule 2 applies to all stages that receive more than one input (i.e., F and G). For each of these stages, each stage that produces its input must precede it. Specifically: B must occur somewhere before F, C must occur somewhere before F, E must occur somewhere before G, and F must occur somewhere before G.

Rule 3 again applies to stages F and G, and states that if the outputs of E and F are both inputs to G, then G will receive the inputs in the order that E and F occur in the config linearization (e.g., within dataset configuration file 441). Assuming that the union operation in stage G is symmetric, the only meaningful implication of rule 3 is B must occur somewhere before C.

The following statements combine all the restrictions imposed by the first three rules:

B<C<F<G, H
A, D, E<G, H

Given these requirements, four linearizations are possible, specifically:

B, C, F, [A, D, E], [G, H]
[A, D, E], B, C, F, [G, H].B, C, [A, D, E], F, [G, H]
B, [A, D, E], C, F, [G, H]

Applying rule 4, however, only the first two of the foregoing linearizations are allowed. With reference to pipeline 590 of FIG. 5, it is apparent that rule 1 (i.e., "every stage with a single input must be immediately preceded by the stage that produces that input") cannot be extended to apply to stages with more than one input, since each branch that produces an input can consist of multiple stages. But we still want to require that all of the stages in one branch occur before any of the stages in the next branch.

In the eight-stage DAG above, two stages receive more than one input, F and G. With respect to F, the stages that produce F's inputs are B and C. B has no ancestors. Therefore, rule 4 only requires that B occur before C and before any of C's ancestors (it has none).

With respect to G, the stages that produce G's inputs are E and F. E has ancestor stages A and D. Therefore rule 4 requires that A, D, and E occur before F or any of F's ancestors (i.e., B and C).

In the third possible linearization listed above (i.e., "B, C, [A, D, E], F, [G, H]"), the second of these conditions is not met, since A, D, and E occur before F. This linearization contains some of the stages of one branch (the one producing G's second input) in the middle of the stages of another branch (the one producing G's first input).

Similarly, in the fourth linearization above allowed by rules 1-3 (i.e., "B, [A, D, E], C, F, [G, H]"). Stages A, D, E occur after B but before F and F's other ancestor, C. This is not allowed under rule 4.

On the other hand, in the first two linearizations listed above, all stages of G's first branch occur before any of the stages of the second branch. Because stage G is a symmetric operation (should produce the same result regardless of the order of its inputs), the relative order of the branches ending with E and F is not important. Therefore, two linearizations are possible for this pipeline. However, note that only the second linearization, where A, D, E<B, C, F, will produce the exact DAG illustrated in the diagram. Although the order of inputs to G does not affect the result of the pipeline, there still is exactly one order. Also, note that if G was not symmetric (e.g., if it was a join), then only one linearization would be allowed per rule 3.

Figure 6:
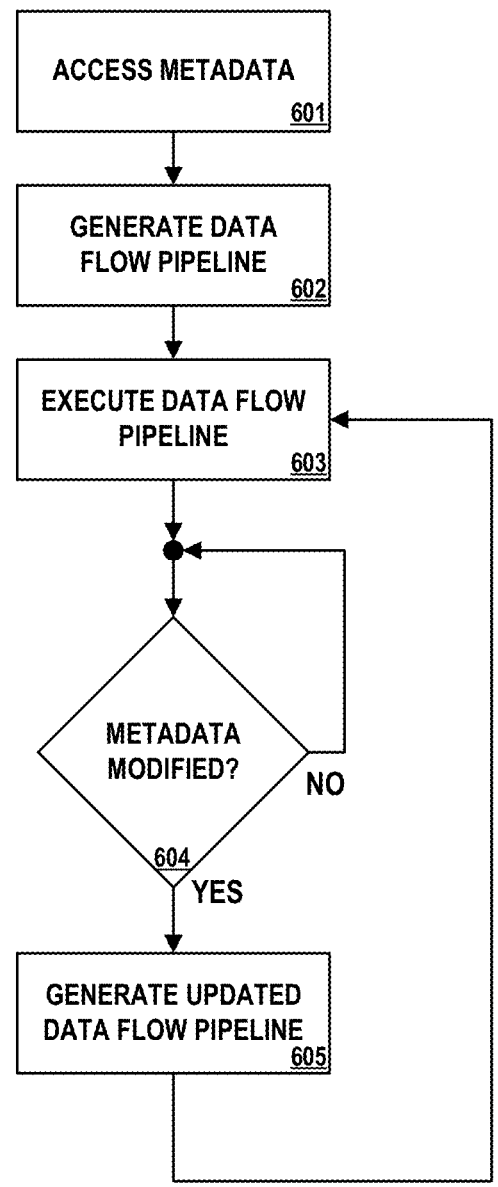
FIG. 6 is a flow diagram illustrating operations performed by an example computing system in accordance with one or more aspects of the present disclosure.

FIG. 6 is a flow diagram illustrating operations performed by an example computing system in accordance with one or more aspects of the present disclosure. FIG. 6 is described below within the context of computing system 210 of FIG. 2. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, and in accordance with one or more aspects of the present disclosure, computing system 210 may access metadata (601). For example, with reference to FIG. 2, driver module 220 calls an interface within framework module 230. Framework module 230, responsive to the interface call, reads one or more of configuration files 240. Framework module 230 determines, based on information about stages of a pipeline included within pipeline configuration file 242, a series of stages for a pipeline.

Computing system 210 may generate a data flow pipeline (602). For example, referring again to FIG. 2, driver module 220 calls an interface within framework module 230. Framework module 230, responsive to the interface call, generates a pipeline corresponding to the stages identified in pipeline configuration file 242. Framework module 230 may, based on information included within pipeline configuration file 242, identify one or more components 250 used to implement the stages. Framework module 230 may also, based on information included within pipeline configuration file 242, identify branches within the pipeline and instances where a state is multi-sourced, meaning that more that the state accepts input from more than one other source or more than one other stage. Framework module 230 generates logical data flow 232, and prepares logical data flow 232 for execution.

Computing system 210 may execute the data flow pipeline (603). For example, still referring to FIG. 2, driver module 220 calls an interface within framework module 230, causing framework module 230 to execute logical data flow 232, which corresponds to pipeline 290. Pipeline 290 is thereby executed. Framework module 230 manages the stages of pipeline 290, and ensures that data flows from the starting stage to the finishing stage within pipeline 290. Framework module 230 stores information generated by pipeline 290.

Computing system 210 may determine whether modifications have been made to the metadata (604). For example, again referring to FIG. 2, input device 216 of computing system 210 detects input that framework module 230 determines corresponds to modifications being made to one or more of configuration files 240. In some examples, framework module 230 may determine that a reference to a stage or component formerly included within pipeline configuration file 242 has been removed. Alternatively, or in addition, framework module 230 may determine that a reference to a new stage or component has been added to pipeline configuration file 242. Alternatively, or in addition, framework module 230 may determine that the order of various stages within pipeline 290 has been changed or rearranged.

Computing system 210 may generate an updated data flow pipeline (605). For example, referring still to FIG. 2, framework module 230 determines that one or more of configuration files 240 has been modified. In some examples, modifications are made to configuration files 240 without any code changes (e.g., without any changes to code used to implement one or more of components 250 or used to execute pipeline 290). Framework module 230 updates logical data flow 232 to reflect the changes.

Computing system 210 may execute the updated data flow pipeline (603). For example, referring once more to FIG. 2, driver module 220 calls an interface within framework module 230, causing framework module 230 to execute pipeline 290. Pipeline 290 is now a different pipeline, since it has been modified based on changes made to configuration files 240. Framework module 230 manages execution of the stages of pipeline 290.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing system 210, computing device 201, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   accessing, by a computing system, metadata identifying characteristics of a data flow pipeline, wherein the metadata includes a linear list of descriptions of a plurality of stages in the data flow pipeline, and wherein each of the descriptions in the linear list of descriptions is ordered in the metadata pursuant to a set of ordering rules;
   constructing, by the computing system and based on the metadata, the data flow pipeline, wherein the data flow pipeline includes a plurality of stages, wherein the plurality of stages includes at least one single sourced stage and a multi-sourced stage in which data output by each of a subset of stages in the plurality of stages are used as input to the multi-sourced stage, and wherein constructing the data flow pipeline includes interpreting the linear list of descriptions in the metadata pursuant to the ordering rules so that (1) the description of each single-sourced stage receiving a single input in the pipeline is immediately preceded by a description of the stage that produces the single input, and (2) the description of the multi-sourced stage is preceded by a description, in a relative order, of each of the subset of stages that produce an input to the multi-sourced stage, wherein the relative order corresponds to an order in which each of the inputs to the multi-sourced stage is received by the multi-sourced stage;
   monitoring, by the computing system, changes to the metadata, wherein monitoring the changes to the metadata includes monitoring a storage device storing the metadata;
   processing, by the computing system, a first set of data using the data flow pipeline;
   detecting, by the computing system, modifications to the metadata resulting in updated metadata, wherein detecting modifications to the metadata includes detecting addition of a reference to a first component in the metadata and detecting removal of a reference to a second component in the metadata;
   constructing, by the computing system and based on the updated metadata, an updated data flow pipeline, wherein constructing the updated data flow pipeline includes interpreting the updated metadata by applying the ordering rules to the updated metadata to:
     add a stage to the pipeline corresponding to the addition of the reference to the first component, and
     remove a stage from the pipeline corresponding to the removal of the reference to the second component; and
   processing, by the computing system, a second set of data using the updated data flow pipeline.

2. The method of claim 1, wherein constructing the data flow pipeline includes:
   interpreting the metadata to identify components included within the pipeline.

3. The method of claim 2, wherein constructing the data flow pipeline includes:
  interpreting the metadata to identify arguments associated with each of the identified components.

4. The method of claim 3, wherein interpreting the metadata includes:
  interpreting high-level descriptions of the components in the metadata, wherein the high-level descriptions provide information about operations performed by each respective component without requiring knowledge of source code used to implement the component.

5. The method of claim 1, wherein constructing the data flow pipeline includes:
  generating a logical data flow in preparation for processing the pipeline.

6. The method of claim 1, wherein constructing the data flow pipeline and constructing the updated data flow pipeline both include:
  executing a standardized driver.

7. A system comprising a storage system and processing circuitry having access to the storage system, wherein the processing circuitry is configured to:
  access metadata identifying characteristics of a data flow pipeline, wherein the metadata includes a linear list of descriptions of a plurality of stages in the data flow pipeline, and wherein each of the descriptions in the linear list of descriptions is ordered in the metadata pursuant to a set of ordering rules;
  construct, based on the metadata, the data flow pipeline, wherein the data flow pipeline includes a plurality of stages, wherein the plurality of stages includes at least one single sourced stage and a multi-sourced stage in which data output by each of a subset of stages in the plurality of stages are used as input to the multi-sourced stage, and wherein to construct the data flow pipeline, the processing circuitry is further configured to interpret the linear list of descriptions in the metadata pursuant to the ordering rules so that (1) the description of each single-sourced stage receiving a single input in the pipeline is immediately preceded by a description of the stage that produces the single input, and (2) the description of the multi-sourced stage is preceded by a description, in a relative order, of each of the subset of stages that produce an input to the multi-sourced stage, wherein the relative order corresponds to an order in which each of the inputs to the multi-sourced stage is received by the multi-sourced stage;
  monitor changes to the metadata, wherein to monitor changes, the processing circuitry is configured to monitor a storage device storing the metadata;
  process a first set of data using the data flow pipeline;
  detect modifications to the metadata resulting in updated metadata, wherein to detect modifications to the metadata, the processing circuitry is configured to detect addition of a reference to a first component in the metadata and detect removal of a reference to a second component in the metadata;
  construct, based on the updated metadata, an updated data flow pipeline, wherein to construct the updated data flow pipeline, the processing circuitry is configured to interpret the updated metadata by applying the ordering rules to the updated metadata to:
    add a stage to the pipeline corresponding to the addition of the reference to the first component, and
    remove a stage from the pipeline corresponding to the removal of the reference to the second component; and
  process a second set of data using the updated data flow pipeline.

8. The system of claim 7, wherein to construct the data flow pipeline, the processing circuitry is further configured to:
  interpret the metadata to identify components included within the pipeline.

9. The system of claim 8, wherein to construct the data flow pipeline, the processing circuitry is further configured to:
  interpret the metadata to identify arguments associated with each of the identified components.

10. The system of claim 9, wherein to interpret the metadata, the processing circuitry is further configured to:
  interpret high-level descriptions of the components in the metadata, wherein the high-level descriptions provide information about operations performed by each respective component without requiring knowledge of source code used to implement the component.

11. The system of claim 7, wherein to construct the data flow pipeline, the processing circuitry is further configured to:
  generate a logical data flow in preparation for processing the pipeline.

12. A non-transitory computer-readable storage medium comprising instructions that, when executed, configure processing circuitry of a computing system to:
  access metadata identifying characteristics of a data flow pipeline, wherein the metadata includes a linear list of descriptions of a plurality of stages in the data flow pipeline, and wherein each of the descriptions in the linear list of descriptions is ordered in the metadata pursuant to a set of ordering rules;
  construct, based on the metadata, the data flow pipeline, wherein the data flow pipeline includes a plurality of stages, wherein the plurality of stages includes at least one single sourced stage and a multi-sourced stage in which data output by each of a subset of stages in the plurality of stages are used as input to the multi-sourced stage, and wherein to construct the data flow pipeline, the processing circuitry is further configured to interpret the linear list of descriptions in the metadata pursuant to the ordering rules so that (1) the description of each single-sourced stage receiving a single input in the pipeline is immediately preceded by a description of the stage that produces the single input, and (2) the description of the multi-sourced stage is preceded by a description, in a relative order, of each of the subset of stages that produce an input to the multi-sourced stage, wherein the relative order corresponds to an order in which each of the inputs to the multi-sourced stage is received by the multi-sourced stage;
  monitor changes to the metadata, wherein to monitor changes, the processing circuitry is configured to monitor a storage device storing the metadata;
  process a first set of data using the data flow pipeline;
  detect modifications to the metadata resulting in updated metadata, wherein to detect modifications to the metadata, the processing circuitry is configured to detect addition of a reference to a first component in the metadata and detect removal of a reference to a second component in the metadata;
  construct, based on the updated metadata, an updated data flow pipeline, wherein to construct the updated data flow pipeline, the processing circuitry is configured to interpret the updated metadata by applying the ordering rules to the updated metadata to:

add a stage to the pipeline corresponding to the addition of the reference to the first component, and
remove a stage from the pipeline corresponding to the removal of the reference to the second component; and
process a second set of data using the updated data flow pipeline.

* * * * *